United States Patent Office 3,342,616
Patented Sept. 19, 1967

3,342,616
REFRACTORY WITH PERICLASE-BASED
STABILIZED SOLID SOLUTION
Allen M. Alper, Corning, and Robert C. Doman, Horseheads, N.Y., assignors to Corhart Refractories Company, Louisville, Ky., a corporation of Delaware
No Drawing. Filed Sept. 20, 1965, Ser. No. 488,772
7 Claims. (Cl. 106—59)

ABSTRACT OF THE DISCLOSURE

Basic refractory made from a mixture comprising essentially MgO and a substantial amount of one of the following magnesia-containing spinel formers: $Al_2O_3$, $Cr_2O_3$, $Mn_2O_3$, $Al_2O_3 + CrO_3$, $Mn_2O_3 + Cr_2O_3$, $$Al_2O_3 + Mn_2O_3$$

and $Al_2O_3 + Cr_2O_3 + Mn_2O_3$. The partial substitution of one or more of the following oxides for MgO in amounts such as not to exceed the MgO content: CaO, MnO, FeO, CoO, NiO, CuO, ZnO and CdO. Refractory specially characterized by a thermally stable solid silution phase based on or formed as a cubic periclase type crystal lattice, whose stability greatly enhances the structural integrity of the refractory for greatly increased periods of serviceable life. Refractory suitable for numerous industrial and technical structural uses in high temperature environment that go as high as 1820° C. or higher, even where the environments involve chemically corrosive and/or abrasive and/or ablative conditions.

---

When any of the above-mentioned formers of magnesia-containing spinel are heated to high temperatures in intimate contact with an excess of MgO, or when melted mixtures of those oxides are cooled somewhat below their complete solidification temperature, it is observed that these spinel formers go into high temperature solid solution in a periclase phase. If the spinel formers are present in amounts in excess of their high temperature total solid solubility in MgO, then another discrete principal phase in addition to percilase will form at high temperature, namely, magnesia-containing spinel. In the latter situation, if one of the multiple oxide spinel formers mentioned above is employed, then it may be possible that one or more simple and/or complex discrete magnesia-containing spinels thereof may be formed, depending upon such factors as their mutual solid solubilities, degree of composition homogeneity and degree of equilibrium conditions during processing.

Upon cooling the high temperature periclase-based solid solution, it is found that the amount of the aforementioned spinel formers that is retainable in solid solution is dependent on temperature and that a lower temperatures the solubility is substantially lowered, thereby resulting in an unstable condition leading to the precipitation or exsolution of discrete spinel phase from the periclase. Many of the industrial and technical service applications for such refractory involve being subjected to temperature cycling, or repeated temperature changes of heating and cooling, that causes repetitive exsolution and resolution of the discrete spinel phase (especially on the portions of the refractory bodies subjected to the greatest extremes in temperature). From our observations, this unstable, repetitively changing crystal structure many times produces internal volume changes and stresses that are detrimental to the structural integrity of the refractory bodies and that tend to precipitate failure by spalling earlier than desired.

Some examples of basic fused cast refractories having discrete magnesia-containing spinel and the thermally unstable periclase-based solid solution (as above described), formed from mixtures of MgO (with or without diluent oxides such as CaO, MnO, FeO, etc.) and the spinel formers enumerated above, are illustrated in U.S. Patents 2,599,566, 2,690,974, 3,132,954 and 3,198,643, and in British patent specifications 893,779 and 965,850.

We have discovered that if lithia is also incorporated in the foregoing type of refractory and processed to a sufficiently high temperature, the $Li_2O$ not only likewise goes into solid solution in the periclase phase or crystal lattice with negligible effect upon the desirable heat resistance of the periclase, but by its presence it substantially increases the amounts of the noted spinel formers that enter into the periclase-based solid solution and, more importantly, the resultant solid solution is then highly stabilized against discrete spinel exsolution or precipitation during temperature cycling incidental to industrial or technical uses. With sufficient $Li_2O$ added, the periclase-based solid solution phase can in fact be so profoundly modified that, even with compositions which would yield 40% or more of discrete spinel phase in the absence of $Li_2O$, the refractory turns out essentially monophase (viz. periclase-based solid solution).

Our invention is broadly defined as a basic refractory comprising essentially a stabilized solid solution phase of $Li_2O$ and selected $R_2O_3$ oxide in a periclase type crystal lattice of RO oxide, wherein:

(1) At least 50% (i.e. 50% to 100%) by weight of said RO oxide is MgO and 0% to 50% by weight of said RO oxide is CaO, MnO, FeO, CoO, NiO, CuO, ZnO, CdO or mixtures thereof, (2) The selected $R_2O_3$ oxide is $Al_2O_3$, $Cr_2O_3$, $Mn_2O_3$, $Al_2O_3 + Cr_2O_3$, $Mn_2O_3 + Cr_2O_3$, $Al_2O_3 + Mn_2O_3$ or $$Al_2O_3 + Cr_2O_3 + Mn_2O_3$$

and (3) The refractory as a whole consists of, analytically by weight:

(a) 0.1% to 15% $Li_2O$
(b) At least 6% of the aforesaid selected $R_2O_3$ oxide
(c) At least 35% of the aforesaid RO oxide
(d) The sum of (a) plus (b) plus (c) being at least 90%
(e) 0% to 7% fluorine
(f) 0 to 8% $SiO_2$
(g) 0% to 10% $TiO_2$
(h) 0% to 2% other incidental impurities naturally occurring in the raw mineral materials employed in making this refractory.

The partial substitution of the other noted RO oxides for MgO in the periclase latice, so as to also be in solid solution therein, has been found permissible as desired without destroying the increased thermal stability of the periclase-based solid solution phase derived from the simultaneous solid solution of $Li_2O$ in the lattice of the periclase-based solid solution. Any of MnO, FeO, CoO and NiO can tolerably be selected individually to make up to 50 wt. percent of the total RO oxide, and likewise any mixture of these oxides up to the 50 wt. percent total could be used when desired. For most practical purposes, CuO, ZnO, CdO or mixtures thereof should not exceed 20 wt percent of the RO oxide. Because of its limited solid solubility in periclase, CaO preferably should not exceed 8 wt. percent of RO oxide for virtually complete solid solution thereof. However, CaO can be tolerated in any silicate phase present, but to assure avoidance of the formation of a second RO oxide phase having poor hydration resistance under ordinary atmospheric conditions, CaO should not exceed 15 wt. percent of the RO oxide.

As previously known, the fluorine can be included for improving the manufacturability of the refractory, especially in assuring good recovery of crack-free merchantable fused cast bodies.

The permissible inclusion of $SiO_2$ makes it possible to use some less expensive, less pure raw mineral materials when desired. However, $SiO_2$ must be strictly kept within the specified limit and should be minimized as much as practical because it tends to form a magnesia-containing silicate phase with a relatively lower melting point which does not contribute to refractoriness and which competes with the periclase phase, as well as possibly with any discrete spinel phase to some limited extent, for a portion of the $Li_2O$ so that this portion of $Li_2O$ is not available for solid solution stabilization in the periclase phase. Within the specified $SiO_2$ limit, at most only very small amounts of silicate are formed which do not prevent an effective stabilizing amount of $Li_2O$ from entering the periclase phase, provided that increasingly higher amounts of $Li_2O$ are used with increasingly higher amounts of $SiO_2$ within the limits specified above. In the virtual absence of $SiO_2$, a 0.1% by weight content of $Li_2O$ is the practicable or effective minimum amount for stabilizing the periclase-based solid solution.

An addition of $TiO_2$ is sometimes desirable, particularly when the $SiO_2$ content is high (e.g. greater than 2.5 wt. percent). The addition of $TiO_2$ to our refractory defined above forms a quite stable, discrete spinel phase with $MgO$, whose composition is closely similar to or includes the theoretical formulas (e.g. $2mgO \cdot TiO_2$ or $Mgo \cdot Ti_2O_3$), because it does not readily go into solid solution in the periclase-based solid solution described above. This we have found fortunate since this discrete titania-containing spinel phase beneficially forms intergranularly between the periclase-based solid solution crystals and prevents the formation of a continuous intergranular silicate phase or matrix in the refractories containing the higher permissible $SiO_2$. The result of this preventative action is increased high temperature strength, which in turn contributes to increased spall resistance of the refractory.

In what we deem a more commercially practical form, the invention can be defined as a basic refractory comprising essentially a stabilized solid solution phase of $Li_2O$ and selected $R_2O_3$ oxide in a periclase type crystal lattice of RO oxide, wherein:

(1) At least 80% (i.e. 80% to 100%) by weight of the RO oxide is $MgO$ and 0% to 20% by weight of the RO oxide is only $CaO$, $MnO$, $FeO$, $CoO$, $NiO$ or mixtures thereof, (2) The selected $R_2O_3$ oxide is $Al_2O_3$, $Cr_2O_3$, $Mn_2O_3$,
    $Al_2O_3+Cr_2O_3$, $Mn_2O_3+Cr_2O_3$, $Al_2O_3+Mn_2O_3$
or $Al_2O_3+Cr_2O_3+Mn_2O_3$ and (3) The refractory as a whole consists of, analytically by weight:

(a) 0.2% to 5% $Li_2O$
(b) At least 8% of the aforesaid selected $R_2O_3$ oxide
(c) 50% to 85% of the aforesaid RO oxide
(d) The sum of (a) plus (b) plus (c) being at least 93%
(e) 0% to 2% fluorine
(f) 0% to 2.5% $SiO_2$
(g) 0% to 3% $TiO_2$
(h) 0% to 1% other incidental impurities normally associated with the raw mineral materials used in forming the refractory.

The improved basic refractory according to our invention may be made either by traditional ceramic procedures of compacting granular batch material and then firing at a temperature of at least 1500° C., but not high enough to cause melting, or by solidification of completely melted batch materials. When the refractory is cast (or otherwise solidified) from fusions (i.e. melts), maximum solid solution of selected $R_2O_3$ oxide noted above is the rule. Although not quite as much solid solutioning is practically obtainable in firing the refractory ceramically, thorough intimate mixing of batch materials and firing at a temperature of at least 1500° C. is capable of providing good results.

Nevertless, because of the assurance of getting maximum stability via maximum stabilized solid solutioning, we prefer to use complete fusion as the method of obtaining our novel refractory having the periclase-based stabilized solid solution. Because of the increased solid solution stability, the fusion or melt may be solidified, if desired, in the furnace shell (i.e. in situ) and the resulting boule or ingot can be subsequently cut into desired shapes (e.g. as by diamond sawing) or crushed into granular material for rebonding by traditional ceramic procedures. It would normally be more economical, however, to cast the fusion as a rather small stream into a stream of fluid (e.g. air or water) flowing across the fusion stream path at a rate sufficient to form small granular particles or globules for rebonding. It is most preferred to cast the fusion directly into molds to produce a unit product of final shape, or to produce billets from which individual blocks of final shapes can be obtained by diamond sawing, which procedure is well known as fusion casting and the product therefrom is commonly denoted as a fused cast article.

Whether for fusion or for sintering, the preferred raw mineral material providing $MgO$ is commercial calcined magnesia obtained from sea water or brine, which usually has a purity of in excess of 98 wt. percent $MgO$. Of course, it is possible to use the less pure mineral products obtained by burning natural carbonates (magnesites) if it is desired to tolerate the higher $SiO_2$ and $CaO$ impurity contents.

As a source of $Li_2O$, the use of technically pure lithium carbonate is desirable despite its cost because the more common ore sources have excessive $SiO_2/Li_2O$ ratios.

Likewise to minimize loss of $Li_2O$ to a silicate phase, it is preferred to supply $Al_2O_3$ as the high purity commercial grade with a purity of 99.5 wt. percent $Al_2O_3$ rather than the less pure sources such as common bauxite, although metallurgical grades of bauxite could be used to advantage, for example, as a small supplemental source of $Al_2O_3$ if desired.

The $Cr_2O_3$ would be most economically supplied from chrome ore and preferably from the Transvaal, Turkish or metallurgical ores that have the higher $Cr_2O_3$ contents. Such ores also provide minor amounts of $Al_2O_3$ and $FeO$ as well as lower percentages of $CaO$ and $SiO_2$. Of course, the chrome ores with lowest $SiO_2$ impurity will be preferred in order to minimize the needed amount of expensive lithium carbonate. Examples of typical acceptable analyses of ores are as follows, in percent by weight:
$Cr_2O_3$, 43–44, 52–55; $Al_2O_3$, 13–17, 10–14; $FeO$, 23–26, 10–16; $Mgo$, 10–12.5, 12–17; $SiO_2$, 1.5–4.0, 0.5–4.5; $CaO$, 0–0.5, 0–1.5; $TiO_2$ (0–0.4, 0–0.4; $MnO_2$, 0–0.1, 0–0.05.

In the event it is desired to employ pure source material for $Cr_2O_3$ despite its higher cost, chrome oxide green (about 99.75 wt. percent $Cr_2O_3$) commercially available as paint pigment is suitable.

An economical source of $Mn_2O_3$ is a manganese oxide ore concentrate. One typical analysis of such concentrate is, by weight: 80+1% $MnO_2$, 5.25% $Al_2O_3$, 2.75% Fe, 1.85% $SiO_2$. Reagent grade $MnO_2$ or the like is also suitable if the expense can be justified for the higher purity.

For deliberate additions of any of the other optional constituents of our refractory, it will be appreciated that any common mineral sources can be employed so long as the analytical limits defining the invention above are satisfied, or else they can be derived from the impurity fractions of the raw mineral materials for the essential constituents. In the case of fluorine, fluorspar of acid grade containing about 98 wt. percent $CaF_2$, only about 1 wt. percent $SiO_2$ and a balance mainly $CaCO_3$ is suitable. An economical and suitable source of $TiO_2$ is rutile, of which a typical analysis is: 96–98 wt. percent $TiO_2$, only 0.2–0.7 wt. percent $SiO_2$ and 0.4–1 wt. percent iron oxide.

In processing the raw mineral materials containing iron oxide into our refractory, the complete fusion procedure is additionally advantageous in that the usual electric melting furnace employed with graphite or carbon electrodes tends to maintain a somewhat reducing atmosphere that provides the iron oxide in the desired form of FeO that can enter into solid solution with the periclase phase in partial substitution for MgO. Such reducing environment may also provide some MnO from the manganese oxide source mineral materials. Similar results can be assured in the traditional ceramic firing procedure by employing a somewhat reducing ambient atmosphere during the firing period.

We have found that determination of the cubic unit cell dimension of the periclase-based solid solution is a convenient way of assessing success of a given ceramic firing of compacted raw material, or of a given solidification of a complete fusion, in stabilizing solid solution since this dimension decreases as solid solution proceeds. Thus, solid solutioning within the periclase lattice that remains stable will cause lower cubic unit cell dimensions for that lattice at room temperature than for such lattice from which unstable solid solution constituents exsolved or precipitated out to form a discrete new phase at room temperature. For example, a cubic unit cell dimension of 4.200 Angstrom units (A.U.) was obtained for a compacted mixture of 90 wt. percent MgO and 10 wt. percent $Al_2O_3$ fired in air at 2500° C. for 30 minutes and cooled to room temperature with a resulting unstable solid solution. When another sample was made like the first one except for the substitution of 10 wt. percent $Li_2O$ for 10 wt. percent of the MgO, the resulting cubic unit cell dimension was only 4.192 A.U., which is a substantial change in such dimension corresponding to stabilization of $Al_2O_3$ in solid solution in the periclase lattice. Moreover, when another sample of the same $Li_2O$-containing composition of the previous one was fired in air at only 2200° C., the stabilization of the solid solution was equally effective and yielded a cell dimension of 4.191 A.U.

In the case of $Cr_2O_3$ and MgO without $Li_2O$, the tendency of the high temperature periclase-based solid solution to unmix is actually so great that it is necessary to quench the product in water even to retain some of the high temperature periclase-based solid solution phase for measurement of the cell constant or dimension. Thus, a cubic cell dimension of 4.203 A.U. was obtained with a compacted mixture of 10 wt. percent $Cr_2O_3$ and 90 wt. percent MgO fired in air at 2200° C. for 20 minutes and then quenched in water at room temperature with some unmixing resulting. Another compacted mixture of 10 wt. percent $Cr_2O_3$, 10 wt. percent $Li_2O$ and 80 wt. percent MgO was also fired in air at 2200° C. for 20 minutes, but then air cooled to room temperature thereby resulting in a cubic cell dimension of only 4.200 A.U. and good solid solution stabilization.

Examples of melted compositions (in weight percent) yielding solidified products exhibiting good solid solution stabilization in the periclase lattice as a result of the presence of $Li_2O$ derived from the carbonate are shown in Table I.

TABLE I

| Melt | Percent | | | | | |
|---|---|---|---|---|---|---|
| | MgO | $Al_2O_3$ | $Cr_2O_3$ | $Mn_2O_3$ | $Li_2O$ | $CaF_2$ |
| 1 | 90 | 6 | | | 4 | |
| 2 | 65.6 | 32.4 | | | 2 | |
| 3 | 65 | 35 | | | 0.5 | |
| 4 | 64 | 33.2 | | | 0.8 | 2 |
| 5 | 90 | | | 6 | 4 | |
| 6 | 90 | | 6 | | 4 | |
| 7 | 46.9 | | 44.3 | | 8.8 | |

When a commercial Transvaal chrome ore, typically analyzing (by weight) 44% $Cr_2O_3$, 23% FeO, 13% $Al_2O_3$, 12% MgO, 4% $SiO_2$, 0.5% CaO, 0.4% $TiO_2$ and 0.05% $MnO_2$, is mixed and melted with about 1 wt. percent fluorspar (acid grade), 0.5 wt. percent rutile, increasing amounts of $Li_2O$ as $Li_2CO_3$ and the balance calcined sea water magnesia, the cooled solidified products exhibit progressively increasing stability of solid solution of $Al_2O_3$ plus $Cr_2O_3$, and possibly some $Mn_2O_3$, in the periclase lattice. The increasing stability is illustrated by the progressively decreasing cubic unit cell dimensions with increasing $Li_2O$ content shown in Table II. And these results occur despite the partition of $Li_2O$ between the periclase phase and the silicate phase.

TABLE II

| Melt No. | Weight Percent | | | | | Unit Cell, A.U. |
|---|---|---|---|---|---|---|
| | Magnesia | Chrome Ore | Rutile | Fluorspar | $Li_2O$ | |
| 8 | 53.5 | 43.8 | 0.5 | 1.0 | 1.2 | 4.208 |
| 9 | 52.8 | 43.3 | 0.5 | 1.0 | 2.4 | 4.200 |
| 10 | 51.7 | 42.4 | 0.5 | 0.9 | 4.5 | 4.185 |

When some of our refractory is produced under somewhat reducing conditions, such as in conventional fusion casting procedure, perfect stability is not always fully retained if subjected to thermal cycling under oxidizing conditions. Thus, when samples of Melt Nos. 8–10 were heated in air at 1400° C. for three days, a very slight amount of discrete spinel did unmix or exsolve from the periclase lattice of Melt No. 10. Presumably the unmixing in Melt 10 was caused by oxidation of some small amount of the FeO to $Fe_2O_3$ thereby forming a very small amount of the new spinel $MgO \cdot Fe_2O_3$. Nevertheless, this did not seriously impair the essential phase stability of the periclase-based solid solution, as can be seen from the relative constancy of the cubic unit cell dimensions, shown in Table III, before and after the heating in oxidizing atmosphere.

TABLE III

| Melt No. | Cubic Unit Cell in A.U. | |
|---|---|---|
| | Before Heating | After Heating |
| 8 | 4.208 | 4.206 |
| 9 | 4.200 | 4.200 |
| 10 | 4.185 | 4.189 |

Since the precision of such determination is generally of the order of 0.003 A.U., no significant change was demonstrable.

As a more practical demonstration of the improvement afforded by the present invention, samples of Melts Nos. 8–10 and a control sample C without $Li_2O$ (54.2 wt. percent magnesia, 44.3 wt. percent chrome ore, 0.5 wt. percent rutile, 1 wt. percent fluorspar) were measured for length and then cycled ten times between 1250° C. and 1650° C. in the course of about 75 hours (a temperature cycle pattern comparable to what might be experienced by the hot face of a roof refractory in an open hearth furnace), after which the samples were cooled to room temperature and the sample lengths were remeasured. The growth or change in lengths expressed as a percent of the original lengths are shown in Table IV and illustrate the correspondence between decrease in objectionable growth with increase in $Li_2O$ content and increase in stability of the periclase-based solid solution.

TABLE IV

| Melt No. | $Li_2O$, Weight Percent | Percent Linear Growth |
|---|---|---|
| C | 0 | 1.55 |
| 8 | 1.2 | 0.91 |
| 9 | 2.4 | 0.44 |
| 10 | 4.5 | 0.00 |

From the above data, it is seen that the growth which is attributed to exsolution and resolution of discrete spinel, mainly within (intragranularly) the periclase crystals, is markedly decreased as the increasing percentage of $Li_2O$ present increases the stabilization of the solid solution within the periclase lattice. Notably, there is a 41% decrease in growth from Melt No. C to Melt No. 8, which corresponds to increasing $Li_2O$ from 0 wt. percent to only 1.2 wt. percent.

Also notable, is the fact that Melt No. C (0 wt. percent $Li_2O$) contains some 40 wt. percent of discrete spinel phase while in Melt No. 10 the 4.5 wt. percent $Li_2O$ completely suppressed such discrete spinel phase crystallization. Further increases in $Li_2O$ may merely further compress the unit cell size. Because of the cost, however, one would normally use only the minimum amount of $Li_2CO_3$ required to eliminate phase instability and growth as major causes of failure in any particular application. For example, Melt Nos. 9 or 10 would serve adequately well, from a growth viewpoint, as a roof refractory in an open hearth furnace where other factors, such as corrosion, then become the major life limiting factors and render additional $Li_2O$ unwarranted as an economic matter.

It must be remembered that whenever a silicate phase is formed in the refractory, that phase will absorb or take up part of the $Li_2O$. To a smaller degree, any discrete spinel present may also take up a small fraction of $Li_2O$. For example, a solidified fusion comparable in composition to the melts in Tables II–IV, but having only 0.2 wt. percent retained $Li_2O$, still showed 33.5 wt. percent of a separate or discrete spinel phase in addition to the periclase and silicate phases. This indicates that much of the $Li_2O$ was present in the silicate phase and possibly a very small amount of the $Li_2O$ was in the spinel phase. In practice of course, it is simply necessary to increase the amount of $Li_2CO_3$ batched to compensate for this loss of effective $Li_2O$ in order to provide an effective amount of $Li_2O$ in the periclase-based solid solution sufficient to stabilize it to the degree practically desired for any particular application. Thus, provided the periclase phase is present as the essential stabilized periclase-based solid solution in accordance with the teaching herein, it is still within the scope of this invention (as defined above) for the refractory to have excess discrete spinel present in an amount larger than the amount of stabilized periclase-based solid solution, e.g. when the MgO plus other RO oxides are at the lower percentages and the selected $R_2O_3$ oxides are at the higher percentages as defined above and in the claims.

Some of the more common uses for which the new refractory is suitable are: crucibles, special block parts and linings for metallurgical and other industrial furnaces, refractory tubes and nozzles for handling hot fluid streams and/or hot solid materials, spark plug insulators and other electrical insulators subjected to elevated temperature environments.

We claim:

1. A basic refractory comprising essentially a stabilized solid solution phase of $Li_2O$ and selected $R_2O_3$ oxide in a periclase type crystal lattice of RO oxide, at least 50% by weight of said RO oxide being MgO and 0% to 50% by weight of said RO oxide being selected from the group consisting of CaO, MnO, FeO, CoO, NiO, CuO, ZnO, CdO and mixtures thereof, said selected $R_2O_3$ oxide being selected from the group consisting of $Al_2O_3$, $Cr_2O_3$, $Mn_2O_3$, and combinations thereof, and said refractory as a whole consisting of, analytically by weight:
   (a) 0.1% to 15% $Li_2O$
   (b) at least 6% of the aforesaid selected $R_2O_3$ oxide
   (c) at least 35% of the aforesaid RO oxide
   (d) the sum of (a) plus (b) plus (c) being at least 90%
   (e) 0% to 7% fluorine
   (f) 0% to 8% $SiO_2$
   (g) 0% to 10% $TiO_2$
   (h) 0% to 2% other incidental impurities naturally occurring in the raw mineral materials employed therefor.

2. A basic refractory according to claim 1 being in the form of a fused cast article.

3. A basic refractory according to claim 1 wherein the selected $R_2O_3$ oxide is solely $Al_2O_3$.

4. A basic refractory according to claim 1 wherein the selected $R_2O_3$ oxide is solely $Cr_2O_3$.

5. A basic refractory according to claim 1 wherein the selected $R_2O_3$ oxide is a mixture of $Al_2O_3$ and $Cr_2O_3$.

6. A basic refractory according to claim 1 wherein at least 80% by weight of said RO oxide is MgO and 0% to 20% by weight of said RO oxide is only selected from the group consisting of CaO, MnO, FeO, CoO, NiO and mixtures thereof, and said refractory as a whole consists of, analytically by weight:
   (a) 0.2% to 5% $Li_2O$
   (b) at least 8% of the aforesaid selected $R_2O_3$ oxide
   (c) 50% to 85% of the aforesaid RO oxide
   (d) the sum of (a) plus (b) plus (c) being at least 93%
   (e) 0% to 2% fluorine
   (f) 0% to 2.5% $SiO_2$
   (g) 0% to 3% $TiO_2$
   (h) 0% to 1% other incidental impurities naturally occurring in the raw mineral materials employed therefor.

7. A basic refractory according to claim 6 wherein the CaO does not exceed 15% by weight of said RO oxide.

References Cited

UNITED STATES PATENTS

| | | | |
|---|---|---|---|
| 2,408,305 | 9/1946 | Field | 106—59 |
| 3,132,954 | 5/1964 | Alper et al. | 106—59 |
| 3,140,955 | 7/1964 | Alper et al. | 106—59 |
| 3,198,643 | 8/1965 | Alper et al. | 106—59 |

TOBIAS E. LEVOW, *Primary Examiner.*

J. POER, *Assistant Examiner.*